United States Patent [19]

Dewhirst

[11] Patent Number: 4,809,282
[45] Date of Patent: Feb. 28, 1989

[54] CRITICAL ANGLE ROTATING PRISM Q-SWITCH

[75] Inventor: Donald R. Dewhirst, Torrance, Calif.

[73] Assignee: Hughes Aircraft Co., Los Angeles, Calif.

[21] Appl. No.: 125,801

[22] Filed: Nov. 2, 1987

Related U.S. Application Data

[63] Continuation of Ser. No. 646,884, Sep. 4, 1984, abandoned.

[51] Int. Cl.$^4$ .............................................. H01S 3/11
[52] U.S. Cl. ...................................................... 372/16
[58] Field of Search ............................... 372/14, 15, 16

[56] References Cited

U.S. PATENT DOCUMENTS

| | | | |
|---|---|---|---|
| 3,398,379 | 8/1968 | Sims | 372/16 |
| 3,434,073 | 3/1969 | Forkner | 372/16 |
| 3,487,331 | 12/1969 | Gates | 372/16 |
| 3,588,249 | 6/1971 | Studebaker | 372/16 |
| 3,597,702 | 8/1971 | Dumanchin | 372/16 |
| 3,711,788 | 1/1973 | Forkner | 372/16 |
| 3,725,817 | 4/1973 | Nolan | 372/15 |
| 3,995,230 | 11/1976 | See | 372/16 |
| 4,525,034 | 6/1985 | Simmons | 372/16 |
| 4,564,949 | 1/1986 | Trolinger | 372/16 |
| 4,660,204 | 4/1987 | Dewhirst et al. | 372/16 |

FOREIGN PATENT DOCUMENTS 60881   4/1982   Japan ..................................... 372/14

OTHER PUBLICATIONS

"New Laser Technique for Ranging Application"; *Nerem Record*; pp. 34, 35; 1962; by Benson et al.

*Primary Examiner*—William L. Sikes
*Assistant Examiner*—Robert E. Wise
*Attorney, Agent, or Firm*—Lewis B. Sternfels; W. J. Streeter; A. W. Karambelas

[57] ABSTRACT

A $CO_2$ TEA laser Q-switch uses an intra cavity rotating prism (70) with internally reflecting surfaces (76, 78) at near the critical angle to produce a variable optical loss such that the gain of the laser is switched as the prism rotates through the critical angle. The nitrogen tail portion of the laser output pulse can be eliminated by switching the gain just after the main pulse at the beginning at the tail. An opto-electronic timing device (100), which includes a graded index glass rod (101) rotating with the Q-switch prism, generates a pulse (88) to initiate the laser discharge at the proper lead time before the prism switches the resonator gain.

4 Claims, 4 Drawing Sheets

CRITICAL ANGLE ROTATING PRISM Q-SWITCH

This is a continuation of Ser. No. 646,884, filed Sept. 4, 1984 and now abandoned.

BACKGROUND OF THE INVENTION

1. Field of the Invention

The present invention relates to a rotating prism Q-switch for use with $CO_2$ TEA lasers, wherein the rotating prism Q-switch uses the principle of internal reflection at near the critical angle to produce an optical loss that switches between a substantial loss for angles less than the critical angle and near zero loss for angles equal and greater than the critical angle.

2. Description of the Prior Art

The $CO_2$ laser has long been available and can be configured to produce a continuous or pulsed laser beam. It is capable of high average power output while, at the same time, maintaining a high degree of spectral purity and spatial coherence. An electric discharge is the most common means of excitation. Operating efficiency and output power are greatly increased by adding nitrogen and helium to the fill gas. Helium aids depopulation of the terminal laser level and $N_2$ excites $CO_2$ molecules by collisional energy transfer. To facilitate the discharge, the CW excited $CO_2$ laser is operated at low pressure, on the order of 100 torr.

It is possible to store energy in the discharge medium by blocking the path of the laser beam within the resonator, thereby preventing laser oscillation. If the block is suddenly removed, the output from the laser occurs in the form of a short duration pulse with peak power two to three orders of magnitude larger than the average continuous-wave power. This mode of operation is called Q-switching. In a typical prior art device in which the gas is excited by CW discharge, Q-switching is accomplished by replacing one of the laser cavity mirrors with a rotating mirror. A laser pulse is produced every time the rotating mirror lines up with the opposite stationary mirror.

A more efficient method of producing high peak power pulses from the $CO_2$ laser is the use of a pulsed high voltage discharge in a gas medium at much higher pressure. This is called the $CO_2$ TEA laser (transversely excited atmospheric) in which the gas pressure is near one atmosphere and the discharge is very fast and transverse to the beam axis. By operating at higher pressure, the density of excited $CO_2$ molecules is increased, thereby proportionally increasing the peak power output. The added difficulty of creating the discharge in the higher pressure gas is offset by the reduced path length of the transverse discharge. The high peak power of the $CO_2$ TEA laser is not accomplished by a Q-switch, but is a result of the fast discharge which causes the gain to build up faster than the laser pulse. This method is called "gain switching".

The fast discharge method is undesirable for many laser applications because sufficient nitrogen excitation remains after the initial laser pulse to sustain laser oscillation at a power level 1/10 to ¼ of the peak. The output energy after the main pulse, commonly referred to as the "tail", typically contains more than half the energy and lasts several microseconds. In laser range finder applications, the tail is back scattered into the receiver thus "blinding" the receiver for the few microseconds that the tail exists, an unacceptable situation.

The tail can be eliminated by the addition of a Q-switch, wherein the Q-switch is on for the main pulse, and then turned off to prevent the tail. The Q-switch also can be operated to increase the peak output power by delaying the initial switch opening so that the laser pulse occurs near peak gain. For the gain switched laser, the laser pulse build up may occur well before peak gain thereby increasing the tail energy.

Since the $CO_2$ TEA laser has an excited state lifetime of only a few microseconds, a timing accuracy of a few hundred nanoseconds is required for the time delay between the gas discharge and Q-switch opening. Heretofore, only the electro-optic Q-switch was capable of providing this degree of timing accuracy. However, the electro-optic Q-switch has serious disadvantages when used with $CO_2$ TEA lasers due to its cost, complexity, fragility, and susceptibility to laser damage.

An arrangement adapting a rotating prism Q-switch for use in a $CO_2$ TEA laser is disclosed in copending U.S. patent application Ser. No. 637,097, now U.S. Pat. No. 4,660,204, entitled "A $CO_2$ TEA Laser Utilizing on Intra-Cavity Prism Q-Switch" by Donald R. Dewhirst and Robert L. Duvall III filed Aug. 2, 1984. The copending application discribes a rotating prism Q-switch in which the prism is interposed between the laser resonator mirrors and is arranged such that the rotation of the prism sweeps the resonator mirrors through alignment with one another once each revolution of the prism. The copending application also describes an opto-electronic timing device, used as well by the present invention, in which the necessary timing accuracy is provided to synchronize the gas discharge with the rotating prism. Whereas the Q-switch of the copending application operates by altering the resonator alignment, the Q-switch of the present invention maintains good resonator alignment, but switches the optical transmission through the prism.

SUMMARY OF THE PRESENT INVENTION

The present invention provides a $CO_2$ TEA laser which is adapted to operate with a rotating prism Q-switch, the prism using internal reflections at near the critical angle to produce an optical transmission that is switched from near 100% transmission to substantially less transmission as the prism is rotated through the critical angle. The rotating prism Q-switch is interposed between the laser resonator mirrors and is configured such that the laser resonator alignment is unchanged by rotation of the Q-switch.

The opto-electronic timing device, disclosed in copending U.S. patent application Ser. No. 637,097, is provided to synchronize the gas discharge with the time in which the prism is at the critical angle, the discharge being triggered about 4 microseconds earlier. Imaging optics of the timing device comprise a graded index fiber optic rod mechanically attached to and rotating with the Q-switch prism. A timing pulse is generated by the timing device once every revolution of the rotating prism. The simultaneous presence of a laser enable signal and the timing pulse initiates the gas discharge to produce a laser pulse. Thus the PRF is controlled by the laser enable signal and the pulse is synchronized with prism rotation by the timing device.

The Q-switch can be operated in the $CO_2$ TEA laser in one of two ways by choosing the direction of rotation. By rotation in a direction to switch from on to off, the $CO_2$ TEA laser is allowed to gain switch and then is switched off just after the main pulse at the beginning of the tail, thus preventing the tail; or, by rotation in the opposite direction to switch from off to on, the laser pulse can be delayed until the $CO_2$ gas medium is near peak gain, thereby increasing the laser pulse peak power. In an alternate embodiment, the prism can be configured to switch twice, switching first off to on and then back to off after a brief period of time.

BRIEF DESCRIPTION OF THE DRAWINGS

For a better understanding of the invention as well as further features and objects thereof, reference is made to the following description which is to be read in conjunction with the accompanying drawings wherein.

It should be noted that the same reference numerals identify identical components in each of the figures.

DETAILED DESCRIPTION OF THE INVENTION

In order to put the present invention in perspective, a discussion of some of the prior art $CO_2$ laser arrangements is first set forth.

Figure 1:
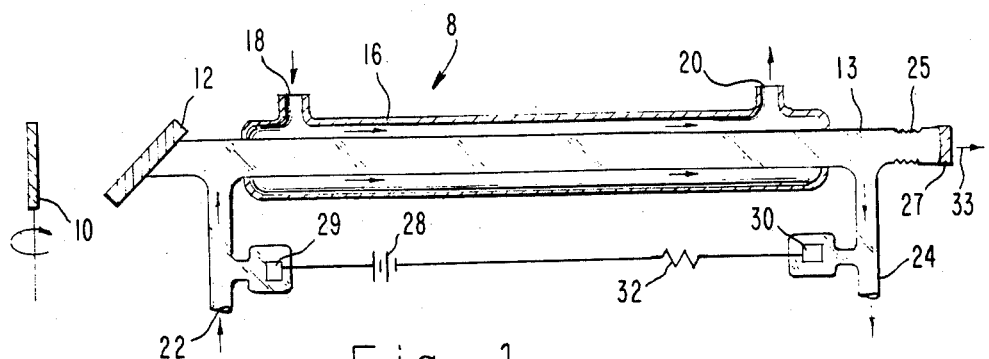
FIG. 1 is a simplified cross-sectional view of a continuous wave $CO_2$ laser modified to use a rotating reflector as a Q-switch to produce a train of pulsed laser outputs.

FIG. 1 shows a prior art continuous wave high power carbon dioxide laser 8 modified to operate in the Q-switching mode by a rotating mirror. The advantages of operating a $CO_2$ type laser in the Q-switching mode has been described hereinabove with reference to the background portion of this application. In essence, Q-switching provides laser output pulses of short duration and high peak power. As illustrated in FIG. 1, Q-switching is accomplished by replacing one of the laser resonator mirrors with a rotating mirror 10. In the simplified version shown, laser 8 additionally comprises a Brewster window 12, pyrex tubing 13, a coolant (usually water) containing enclosure 16 having inlet and outlet ports 18 and 20, respectively, gas inlet and outlet ports 22 and 24, respectively, flexible bellows 25 and output mirror 27. A source of potential 28 is coupled between electrodes 29 and 30 via resistor 32 as illustrated. A premixed gas typically comprising $CO_2$, $N_2$ and He is introduced into the tubing 13 via inlet port 22. Mirror 27 is dielectrically coated and partially transmits, partially reflects laser radiation 33 of 10.6 microns.

In operation, mirror 10 is caused to rotate so that optical alignment of mirrors 10 and 27 occurs periodically. The continuous train of high peak power laser pulses are useful for certain cutting and machining operations, optical communications and optical radar.

Figure 2:
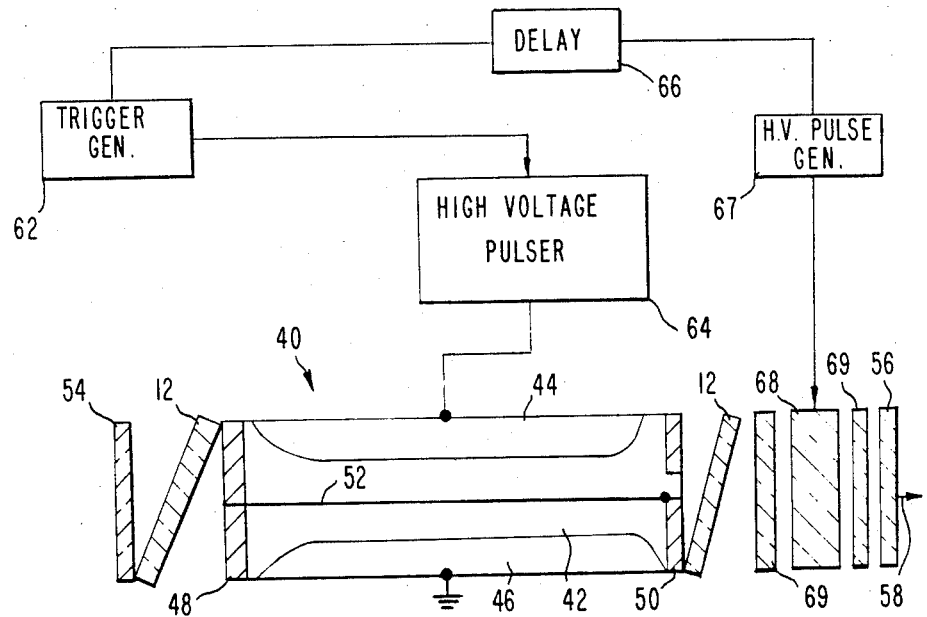
FIG. 2 is a simplified cross-sectional view of a prior art $CO_2$ TEA laser modified to use an electrooptic Q-switch.

FIG. 2 illustrates a $CO_2$ TEA laser 40 (a type of $CO_2$ laser in which excitation of the active medium is transverse to the laser beam axis and, because of a shorter breakdown length, can operate in a gas pressure range higher than that for longitudinally excited gas lasers, thus achieving a higher power output per unit volume because of the greater density of lasing molecules) using fast discharge electric excitation. For purposes of simplicity, the gas and coolant inlet and outlet ports have not been illustrated. Laser 40 may use water cooling and/or circulate the gas through a heat exchanger for high PRF (pulse repetition frequency) operation. The laser gas mixture is introduced to pyrex tubing 42 at near one atmospheric pressure. Pyrex tubing 42 contains parallel plate electrodes 44 and 46. Ceramic capacitors 48 and 50 support a pre-ionization trigger wire 52 which extends between them and are aligned parallel to plate electrodes 44 and 46. A fully reflecting mirror 54 and a partially reflecting mirror 56 are arranged at each end of laser 40 to form the optical resonator cavity. Laser output 58 at 10.6 microns is transmitted by the output mirror 56.

In operation, trigger generator 62 energizes high voltage pulser 64, the output of which is applied to metal electrode 44. A high voltage pulse produced by pulser 64 ionizes the gas within tubing or envelope 42 causing a glow discharge to occur, the glow discharge causing the active medium ($CO_2$ molecules in this case) to be excited to a population inversion condition to provide for laser operation. Trigger generator 62 also activates H. V. pulse generator 67 to apply a high voltage pulse to an optical shutter device 68 after a time delay 66. Optical shutter device 68 is the electro-optic Q-switch described hereinabove and is effective to prohibit transmission of the laser light within the laser resonator formed by mirrors 54 and 56 unless it is turned on. Shutter 68, typically comprises a CdTe electro-optical crystal with polarizers 69 at each end. Shutter 68 transmits laser light at 10.6 microns when a high voltage pulse from H.V. pulse generator 67 is applied thereto, such high voltage typically being a pulse of fixed time duration.

Time delay 66 is predetermined, and chosen to open shutter 68 to produce the laser pulse at a time when the gain medium is near maximum gain, thereby producing the maximum peak output power. The time duration of the high voltage pulse applied to shutter 68 is chosen to close shutter 68 just after the main pulse thereby prohibiting the low intensity tail that normally would follow.

Although accurate timing can be provided by the combination of delay element 66 and shutter 68, this combination is rarely used for $CO_2$ TEA lasers because of the cost, complexity, fragility and susceptibility to laser damage of the electro-optic shutter 68 and polarizers 69.

Figure 3:
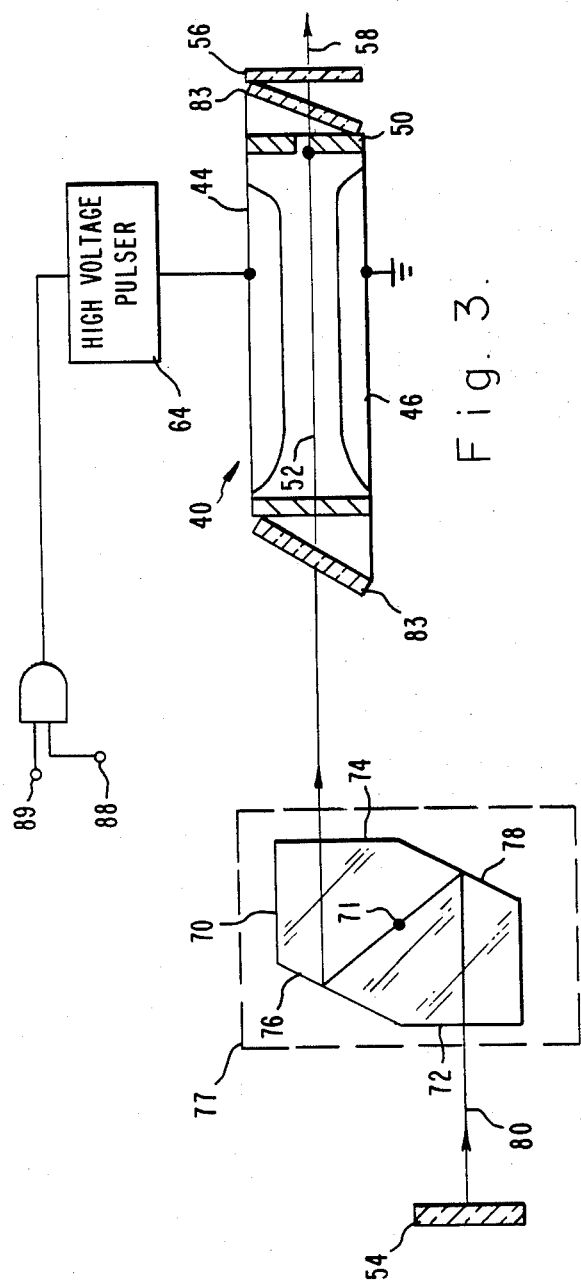
FIG. 3 is a partial cross-sectional view of a $CO_2$ TEA laser which incorporates a rotating prism Q-switch with internal reflections at near the critical angle to produce an optical transmission that is switched between 100% and substantially less as the prism is rotated through the critical angle in accordance with the teachings of the present invention.

FIG. 3 illustrates the $CO_2$ TEA laser shown in FIG. 2 modified in accordance with the teachings of the present invention. It should be noted that although the present invention is directed to $CO_2$ TEA lasers, the invention can be utilized with other types of lasers and in applications requiring rapidly switched transmission of a collimated light beam.

An intracavity Q-switch prism 70 is mounted for rotation about an axis 71. Light generated in the resonator cavity formed between mirrors 54 and 56 is reflected by the inclined surfaces 76 and 78 of prism 70 as illustrated. Mirrors 54 and 56 are in optical alignment with one another through internal reflections off surfaces 76 and 78 of prism 70. Prism 70 comprises entrance and faces 72 and 74 with two parallel surfaces 76 and 78 that are inclined, in the illustration of FIG. 3, at near the critical angle to the resonator axis 80 which is perpendicular to mirrors 54 and 56. The term "critical angle" is the minimum angle at which total internal reflection occurs for light going from a dense to a less dense medium, causing the refracted ray to just graze the surface interface (and decrease in amplitude to zero). At greater angles, substantially all of the incident light will be internally reflected.

The direction of rotation in FIG. 3, in one embodiment of the invention, is clockwise about axis 71. Prior to alignment of surfaces 76 and 78 at the critical angle with the resonator axis 80, a substantial part of the incident beam defined by the resonator axis 80 is lost at each surface 76 and 78. At and beyond the critical angle, the incident beam is totally reflected with substantially no loss. Note that the incident and exit beams are parallel irrespective of the orientation of prism 70, thus the resonator alignment does not change. The prism 70 functions as a Q-switch in the laser formed by aligned mirrors 54 and 56, the normal to the resonator mirrors defining the resonator axis and the angle made by the laser beam with surfaces 76 and 78 of prism 70. A total of four internal reflections at the prism surfaces 76 and 78 per round trip transit of the resonator contribute to the switched loss.

The normalized intensity per reflection of the internally reflected beam, $r_p$ and $r_s$, derive from the Fresnel formulae and are the following:

$$r_p = \left[\frac{R_p}{A_p}\right]^2, \; r_s = \left[\frac{R_s}{A_s}\right]^2$$

$$R_p = \frac{\tan(\theta_i - \theta_t)}{\tan(\theta_i + \theta_t)} A_p$$

$$R_s = \frac{\sin(\theta_i - \theta_t)}{\sin(\theta_i + \theta_t)} A_s$$

where A and R are the incident and reflected amplitudes, respectively, and p and s denote polarization components parallel and perpendicular respectively to the plane of incidence. $\theta_i$ and $\theta_t$ are, respectively, the incident and transmitted angles of the beam to the surface normal. The normalized intensities, $r_p$ and $r_s$, of the reflected beam (for the parallel and perpendicular polarization components) for each reflection from surface 76 and 78 and hold for angles of incidence less than the critical angle. Greater than the critical angle, $r_p$ and $r_s$ equal one (i.e. total internal reflection). Since there are four reflections from surfaces 76 and 78 per round trip of the resonator, the Q-switch attenuation is the fourth power of $r_p$ and $r_s$.

Figure 4:
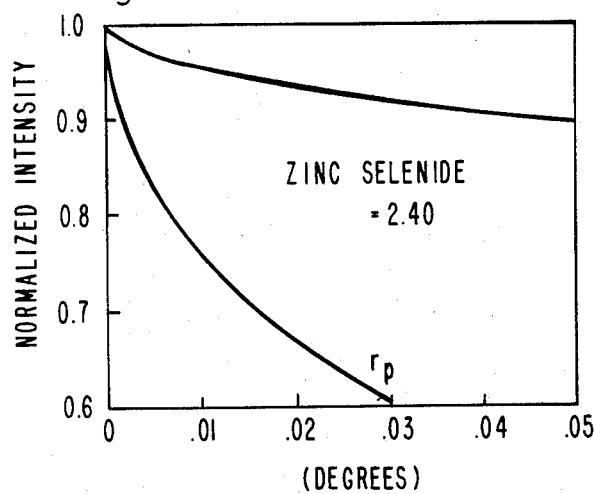
FIG. 4 is the normalized intensity (transmission) at angles near the critical angle of a rotating prism Q-switch comprising zinc selenide.

Zinc selenide with a index of refraction of 2.40 is a suitable material for the prism for operation at 10.6 microns. Curves of $r_p$ and $r_s$ for zinc selenide are given in FIG. 4 as a function of angle of incidence, $\Delta$, less than the critical angle. A typical $CO_2$ TEA laser has approximately 2% gain per cm with 15 cm discharge tube. For 20% output coupling per round trip transit, the net round trip gain is 1.5 which requires the normalized intensity, r, to be less than 0.91 (fourth root of 1/1.5). This is achieved with an angle $\Delta$, or "hold off" angle (angle in which there is sufficient loss in prism 70 to offset gain in the laser medium and thereby prevent the laser pulse buildup) less than 0.03 degrees. If brewster angle plates 83 are also included in the resonator to allow only the parallel polarization, hold off is achieved with an angle $\Delta$ less than 0.001 degree.

The switching speed, $\tau$, is the time to rotate the internal reflected beam within the prism between the critical angle and the angle for which loss is high enough not to support the tail. To effectively eliminate the tail, it should be short compared to the tail duration. The switching speed, $\tau$, is calculated as follows:

$$\tau = \frac{\Delta}{6w/n}$$

where w is the prism rotation rate in rpm, $\Delta$ is the hold off angle, and n is the index of refraction.

Usually the hold off angle will be increased by a combination of factors other than prism rotation rate such as parallelism of surfaces 76 and 78, prism surface flatness and diffraction effects. These contribute to angular blur of the laser beam and consequently increase the hold off angle. Flatness specifications of $\frac{1}{8}\lambda$ at 632.8 nanometers and parallelism of surfaces 76 and 78 to within 10 seconds are compatible with a hold off angle of 0.005 degrees and will usually eliminate these two factors as the limiting factors. At 10.6 micron operating wavelength, the hold off angle usually will be limited by diffraction for all but the largest aperture systems. For a typical 20 mm aperture, the angular blur from diffraction is about 0.03 degrees requiring 40K rpm prism rotation to achieve an estimated switching speed of 300 nanoseconds, which would reduce the typical tail duration by approximately a factor of 10. Because the gain during the tail is much lower than the peak gain, the estimate is conservative.

In the preferred embodiment of the Q-switch, prism 70 in FIG. 3 is rotated in the counter-clockwise direction so that the resonator is switched from on to off as the prism arrives at and passes through the critical angle with the laser resonator. When operated in this way, the $CO_2$ TEA laser is permitted to gain switch with the Q-switch on, and the gas discharge timing is adjusted such that the prism arrives at the critical angle just after the initial high peak power pulse and at the beginning of the tail. The optical loss increases as the angle becomes less than the critical angle until the angle $\Delta$ is reached, when the laser oscillation producing the tail no longer is supported and ceases to exist. Thus, the tail is eliminated within 200 to 300 nanoseconds after the main pulse.

In a second embodiment of the Q-switch, prism 70 is rotated in the clockwise direction so that the resonator is switched from off to on as the prism arrives at and passes through the initial angle with the resonator. Operated in this way, the peak power of the $CO_2$ TEA laser can be maximized by delaying the laser pulse until near the peak gain of the $CO_2$ gas medium. This is accomplished by adjusting the gas discharge timing such that the prism arrives at the critical angle at the proper time to produce the laser pulse at near the maximum gain of the $CO_2$ gas medium. Since the Q-switch remains on after the pulse in this embodiment, the nitrogen tail will be produced, although it may be somewhat less because the initial laser pulse is delayed.

Figure 5:
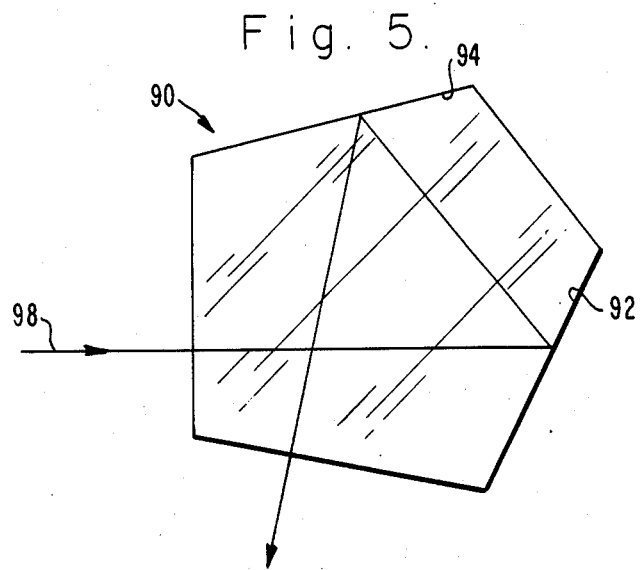
FIG. 5 is another prism configuration using the critical angle switching technique.

FIG. 5 illustrates a prism design that can be made to switch both ways, in an off-on-off sequence, to switch on at near peak gain and off to eliminate the tail. The angle between the two internally reflecting surfaces 92 and 94 of prism 90 is made a bit larger than twice the critical angle, the extra amount providing the desired Q-switch "on" time. Assuming clockwise rotation in FIG. 5, prism 90 switches on when the first internal reflecting surface arrives at the critical angle and remains on until the second internal reflecting surface arrives at the critical angle. Although not illustrated, the laser mirrors and cavity are arranged to appropriately interact with light beam 98.

Figure 6:
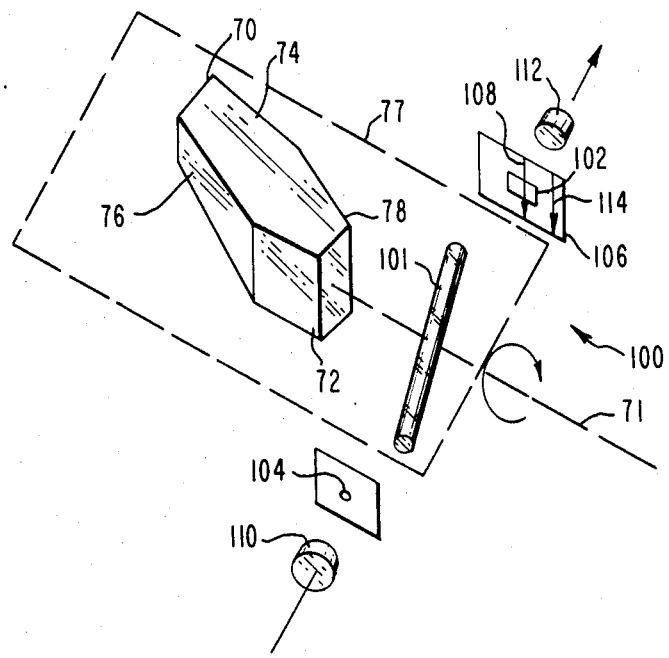
FIG. 6 is a simplified optical schematic of the components which comprise the opto-electronic timing device.

FIG. 6 shows an opto-electronic timing device 100 in accordance with the teachings of the present invention. A significant difference exists between the electro-optic and rotating prism Q-switches wherein for the prism switch, a laser pulse can only occur at times in which the prism is aligned with the resonator mirrors. Timing device 79 generates a prealignment signal to trigger the discharge at the proper time before prism alignment. The required lead time for a $CO_2$ TEA laser typically is about 4 microseconds with 10% maximum variation (repeatability of pulse initiation time) to minimize the shot to shot variance of the output power. Prior to the present invention and to that of copending U.S. patent application Ser. No. 637,097, now U.S. Pat. No. 4,660,204, the rotating prism Q-switch was not capable of being used in a $CO_2$ TEA laser because of the gas discharge timing problem.

Timing device 100 comprises a graded index glass rod 101, a slit 102 and its associated plane 106, a pinhole 104, a LED source 110 and a photodetector 112. The graded index rod 101 (such as the SELFOC fiber optic rod manufactured by the Nippon Sheet Glass Company, Ltd., Tokyo, Japan) has a radial index of refraction that is parabolic in that the index of refraction of the core is greatest on its optical axis and continuously decreases towards the periphery. As such, the rod 101 has the characteristics of a common spherical lens. The optical imaging properties are determined by rod length and source object location.

Slit 102 and pinhole 104 are placed at approximate equal distances from and on a line through axis of rotation 71. The pinhole/slit separation and the graded index rod length are chosen so that the rod forms an erect real image of the pinhole on the plane 106 of the slit 102. The importance of forming an erect rather than an inverted image is because an inverted image of the pinhole 104, due to the optics involved, would be stationary on the slit plane 106 as the rod 101 is rotated through the alignment with the pinhole 104. An erect image, on the other hand, is swept across the slit 102 in the direction of arrow 108 as the rod 101 is rotated through alignment. It should be noted that a pair of lenses (to provide an erect image), configured to form an optical relay, also may be utilized to accomplish the same function as rod 101, rod 101 being the preferred technique because of its smaller size. The rear surface of pinhole 104 is continuously illuminated by LED light source 110 and the illuminated pinhole image is detected by a PIN photodiode 112 oh the rear surface of the slit 102. The length of the rod 101 and pinhole location determine the type of image, i.e., erect or inverted, formed at the slit 102. The width w of slit 102 preferably is on the order of the image width, the length of the slit not being critical to the operation of the present invention. It should be noted that an LED with a small emitting area can be utilized, thus eliminating the need for pinhole 104, which is utilized only to define the image size. A small image is desired for good timing accuracy. Since it is desired to generate only one pulse per rotation of the rod 101, the end for end ambiguity of rod 101 is eliminated by cutting one rod end at a slight angle so that the pinhole image does not sweep across the photodiode 112 for the incorrect rod orientation as illustrated by arrow 114.

In operation, when the pinhole image crosses slit 102 for the correct rod orientation, a pulse is generated by the photodiode 112 which causes a logic level pulse to be coupled to terminal 88 (FIG. 3). When a laser enable signal also is present at 89, high voltage pulser 64 is energized, causing the gas discharge to form in $CO_2$ TEA laser 40 as described hereinabove and illustrated in FIG. 2 for the electro-optic Q-switch.

The relative angular relationship between the pinhole/slit combination, graded index rod, resonator mirrors and prism establishes the lead angle which, together with the prism rotation speed, determines the trigger pulse lead time. The lead angle is adjusted to trigger the gas discharge approximately 4 microseconds before the prism arrives at the critical angle. The lead angle is so small (typically about 0.2 deg) that the angle must be established by adjustment of the pinhole/slit orientation, optimizing the laser output while the laser is fired at a convenient PRF. It also is helpful to adjust the angle slightly greater than needed, and add a variable delay in the electronic circuitry.

Figure 7:
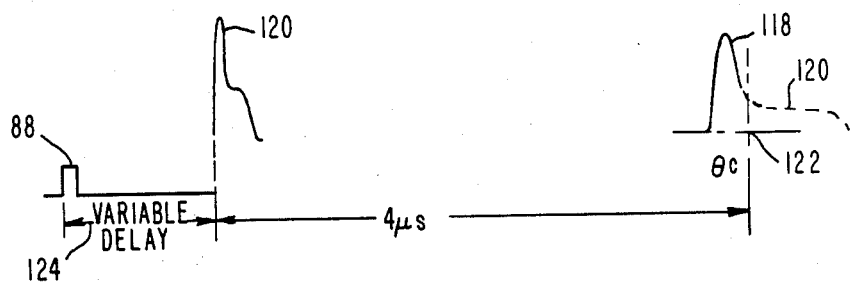
FIG. 7 is a timing sequence diagram illustrating the triggering pulse timing provided to initiate lasing of the $CO_2$ TEA laser shown in FIG. 3 and the resultant laser pulse output.

The timing sequence, where the switch goes from on to off to prevent the tail, is shown in FIG. 7. The photodiode trigger pulse 88 energizes the high voltage pulser after time delay 124, at a time when the prism is rotationally positioned greater than the critical angle (prism 70 rotated in the counter-clockwise direction such that the Q-switch is on). The high voltage output pulse 120 ionizes the $CO_2$ gas mixture forming a glow discharge. The laser pulse build up begins when sufficient gain is reached, producing laser pulse 118 approximately 4 microseconds after the gas discharge. The discharge timing is adjusted such that the prism arrives at the critical angle $\theta_c$, at the approximate termination of the initial laser pulse to prevent further laser oscillation, thus eliminating the tail 120. A very small tail portion 122 may, in fact, remain.

Prism 70 can be rotated in the clockwise direction, the optical loss being produced in an off to on sequence, with the timing adjusted to delay the laser pulse until maximum gain is achieved in the $CO_2$ gas medium. This produces a greater peak power output pulse than when the laser is allowed to gain switch. The tail will still occur although it may be of shorter duration.

Pulse timing variation or "jitter" is an important parameter in the present invention and relates to shot to shot time variation between the photodetector trigger pulse 88 and the optimum prism switching time. The three largest sources of pulse jitter of timing device 79 are variations of the photodiode current pulse amplitude, prism rotation speed and time delays within the pulser itself. Pulse jitter of these can be reduced by controlling the prism rotation speed to within 2%, proper design of the pulser electronics and pulse differentiating the photodiode output current pulse With these controls, the shot to shot time jitter could be held to about 150 nanoseconds RMS, which is well within the requirement for a $CO_2$ TEA laser Q-switch.

The present invention thus provides a Q-switch for a $CO_2$ TEA laser wherein the nitrogen tail, normally associated with the gain switched pulse, is eliminated. The opto-electronic timing method utilized in conjunction with the rotating prism Q-switch avoids the complexity, fragility and susceptibility to laser damage of electro optic Q-switches.

While the invention has been described with reference to its preferred embodiments, it will be understood by those skilled in the art that various changes may be made, and equivalents may be substituted for elements thereof without departing from the true spirit and scope of the invention. In addition, many modifications may be made to adapt a particular situation or a material to the teaching of the invention without departing from its essential teachings.

What is claimed is:

1. Apparatus for controlling the output of a pulse laser device comprising:
   a laser device having an active medium and means for exciting said medium for producing a laser output, a prism Q-switch and means for rotating said prism, and first and second resonator mirrors,
   said active medium and said prism being interposed between said first and second mirrors,
   said first and second resonator mirrors having an arrangement which defines an optical path through said active medium and through said prism, said mirrors further being aligned optically parallel to one another with respect to said optical path, and
   said prism having at least one internal reflecting surface upon which said optical path is reflected at the critical angle once for each revolution of the prism, for enabling the optical loss associated with said internal reflection to be changed when the internal reflection is swept through the critical angle.

2. The apparatus of claim 1 wherein said laser device comprises a $CO_2$ TEA laser, and said rotating means is coupled to said Q-switch prism for switching the optical loss from a high loss to substantially zero as said prism is rotated through the critical angle and for adjusting the timing relationship between the excitation of the active medium and the rotation of said prism through the critical angle to cause the laser pulse to occur at near maximum gain in the active medium.

3. The apparatus of claim 1 wherein said laser device comprises a $CO_2$ TEA laser, and said rotating means is coupled to said Q-switch prism for switching the optical loss from substantially zero to a high loss as said prism is rotated through the critical angle and for adjusting the timing relationship between the excitation of the active medium and the rotation of the prism through the critical angle to allow the laser to gain switch with the loss substantially zero and to prevent the tail portion of the pulse by switching to high loss at the beginning of the tail.

4. Apparatus for controlling the output of a pulse laser device comprising:
   a laser device having an active medium and means for exciting said medium for producing a laser output, a prism Q-switch and means for rotating said prism, and first and second resonator mirrors;
   said active medium and said prism being interposed between said first and second mirrors;
   said first and second resonator mirrors having an arrangement which defines an optical path through said active medium and through said prism, said mirrors further being aligned optically parallel to one another with respect to said optical path; and
   said prism having at least one internal reflecting surface upon which said optical path is reflected at the critical angle once for each revolution of the prism, for enabling the optical loss associated with said internal reflection to be changed when the internal reflection is swept through the critical angle, said prism comprising entrance and exit faces with two parallel surfaces, in which the laser beam is internally reflected at the critical angle simultaneously for said two parallel surfaces.

* * * * *